United States Patent Office 3,425,907
Patented Feb. 4, 1969

3,425,907
NUCLEAR ENERGY REACTOR PLANT HAVING ONE OR MORE HEAT EXCHANGERS
Wouter G. Bonsel, The Hague, and Henry H. Weevers, Gouda, Netherlands, assignors to Reactor Centrum Nederland, The Hague, Netherlands, Institute of the Netherlands
Filed Aug. 9, 1966, Ser. No. 571,255
Claims priority, application Netherlands, Sept. 20, 1965, 6512195
U.S. Cl. 176—65    5 Claims
Int. Cl. G21c 19/28, 15/00

ABSTRACT OF THE DISCLOSURE

Nuclear energy reactor plant with a number of heat-exchangers connected with co-axial conduits to the reactor vessel, in which plant the same vessel and the same core lay-out may be adopted for a scale of power levels. For the required power level of the reactor ordered, only minor changes in prefabricated parts will be necessary.

---

The invention relates to a nuclear energy reactor plant comprising a nuclear reactor, one or more heat exchangers each containing part of a primary circuit and part of a secondary circuit, means for circulating a heat-transmitting fluid through the reactor and the primary circuit components of the heat exchanger or heat exchangers, walls resistant to internal pressure which envelop the heat exchanger or heat exchangers as well as the reactor in such a manner that they form one integral wall construction embodying the reactor as well as the heat exchanger or heat exchangers, coaxial reactor inlet and reactor outlet connections of which each external heat exchanger-connection connects the reactor-enveloping part of the pressure-proof wall with a wall component enclosing a heat exchanger, each heat exchanger being mounted laterally and at the height of the reactor core, and each external reactor connection passing laterally through the walls of the reactor and heat exchanger, whilst at least one external reactor connection is connected with the upper part of the corresponding heat exchanger and emerges from the reactor vessel above the core of the reactor.

By way of explanation of the concept defined as "integral wall construction," it is here observed that this term denotes the so-called "primary pressure skin."

The secondary part of each heat exchanger is situated inside a pressure skin forming one with the skin of the reactor vessel.

According to the invention, a plant of this type is improved in such a way that the place of connection to the reactor vessel permits the unrestrained use of jet apparatuses to afford support to internal recirculation of the cooling medium. By designing the reactor in such a way that any desired number (within certain limits) of heat exchangers can be connected at will to the reactor vessel, the advantage is gained that one and the same reactor design can be adapted for a number of different capacities. The larger the capacity the larger the number of heat exchangers the reactor will require.

Of these heat exchangers, each having its own pump, only a small number of types need be developed. As a rule not more than three types will be needed. These types differ from each other mainly in that they are designed in such a way as to form a series of types with ascending heating areas.

Accordingly, as a larger capacity of the reactor plant is desired, a larger number of heat exchangers may be connected to the reactor. Whereas for very small capacities one, two or three heat exchangers may be found sufficient, as many as, say, four, five or six heat exchangers may be used in the case of larger capacities. As heat exchangers are available in the above-mentioned series of types, the number to be used can within certain limits be selected practically at will.

Very advantageous in this connection is the fact that the plant remains compact, even if, say, six heat exchangers are connected to the reactor vessel.

The reactor vessel itself need undergo little or no change for the various capacities. The same applies to the dimensions of the reactor cores to be used for these various capacities.

It will only be necessary to ascertain that the ring-shaped accumulating box is also adjusted to the required reactor power.

This adjustment is taken care of, by opening up the one or more jet nozzles to the required throughput.

The type of reactor plant here proposed compares very favorably, as regards the extension possibilities mentioned, with known reactor plants having heat exchangers inside the reactor.

In these plants the extension of a given design to a higher capacity quickly leads to a well-nigh insoluble problem. It is then found impossible to accommodate the additional heat exchangers required inside the reactor vessel without arriving at colossal dimensions. In the above-mentioned known plants of high capacity this results in heavy installation costs which are detrimental to the economic production of energy.

A further advantage as compared with known plants is obtained by the fact that the pump or ventilator which is to provide for circulation of the primary cooling medium is installed in such a manner outside and against the wall that is resistant to internal reactor pressure that this pump is accessible for inspection purposes and can, moreover, be easily assembled or dismantled. The dismantling of such a pump also affords access to a first half of the mouth openings of the pipes installed in the heat exchanger. This renders it possible to plug up both openings of any pipes that may have become leaky, so that the leakage of the pipe will no longer be obstructive to the working of the plant.

The second half of the pipe bundle, which may be U-shaped, is installed in a ring around the circulation pump or ventilator in such a way that the pipes are accessible in groups through a hand-hole cover.

The installing of the circulation pump or ventilator in this way over the pipe bundles of the heat exchanger, is rendered possible by the fact that supply and discharge channels for this pump or ventilator are situated between the first and second half of the pipe outlets, which are assembled in a pipe plate.

The heat exchangers offer the special advantage that thermal expansions can have perfectly free play. This is a result of the fact that each heat exchanger is firmly connected with the reactor vessel by only one coaxial connection, which is also conducive to a compact construction. For any further support which might be necessary for each heat exchanger, auxiliary components may be provided which enable the thermal expansion movements to take place, for instance, in mutually perpendicular directions and which may be fitted between the face-to-face parts of the walls which enclose each heat exchanger and the reactor. These auxiliary components are, however, not illustrated in the figures below.

A considerable saving is furthermore effected in the plants according to the invention by the fact that the very costly isolation valves between the reactor vessel and each heat exchanger are superfluous, since the heat exchangers are situated inside the pressure skin of the primary system.

On the basis of the undermentioned figures, some embodiments of the invention will be further described below.

The accompanying figures illustrate the following:

FIGURE 1 gives a vertical cross-section of a heat exchanger mounted sideways against a nuclear reactor;

Figure 1:
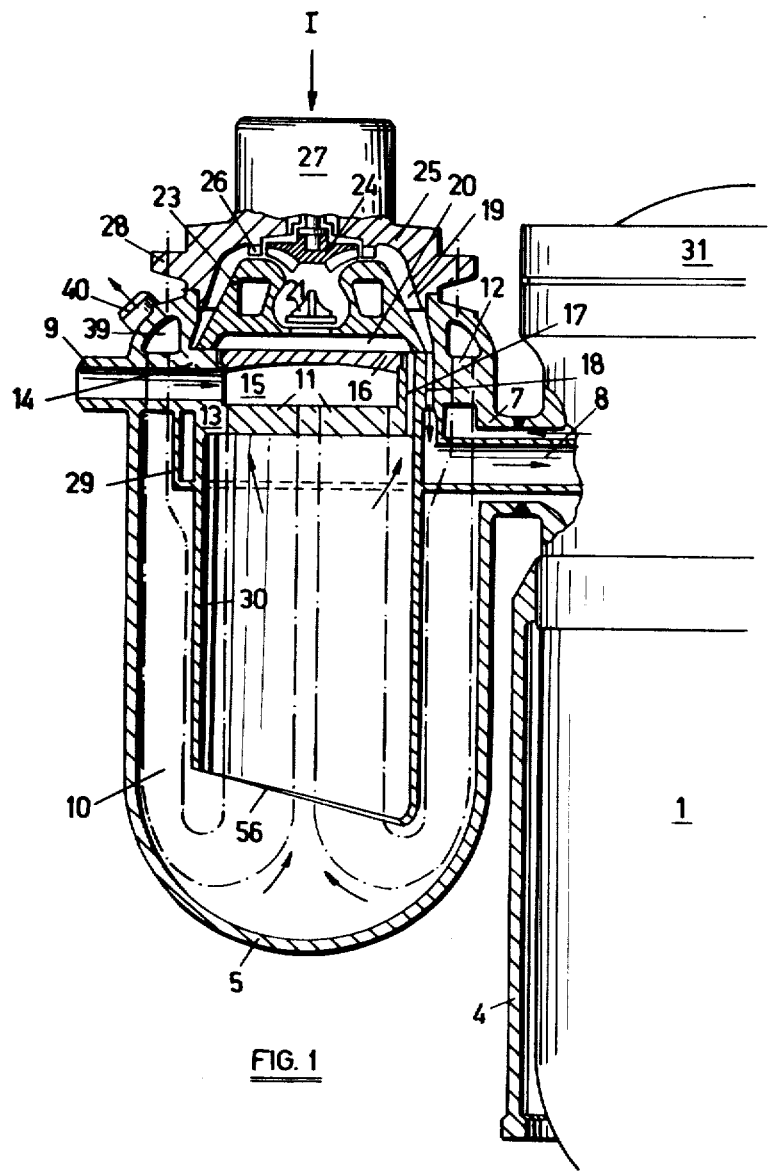

Reference numeral 1 in FIGURE 1 shows the reactor, closed at the top by a cover 31 and supported by a foundation cylinder 4. The primary cooling medium is discharged from the reactor by conduit 7. After this medium has dissipated its heat in the heat exchanger 5, it is returned to the reactor by conduit 8. Conduits 7 and 8 are short connecting butts which run coaxially.

The heat exchanger 5 is constructed as follows:

Mounted in the top part of the vessel of the heat exchanger is a pipe plate 13/14 running substantially horizontally which separates the chamber of the primary cooling medium from the chamber which receives the steam produced, as well as the chamber in which the pump is installed. The pipe plate 13/14 has a peripherally situated part 14 and a more centrally situated part 13 which is positioned somewhat lower. As the central part 13 is staggered with respect to part 14, a chamber 15 is formed in which the secondary cooling medium, e.g. water, flowing in through conduit 9, can accumulate before passing through the pipes of the heat exchanger. These heat exchanger pipes are indicated in outline as 10. Although, in the embodiment shown, these pipes are U-shaped, it is also possible to pass them several times to and fro. It is merely necessary that both the inlet and outlet of each heat exchanger pipe are fixed in pipe plate 13/14. In the embodiment shown, the heat exchanger pipes issue into a ring-shaped chamber 39. The steam produced, which accumulates in this chamber, can be discharged from it by one or more steam connections 40. The primary cooling medium passes out of the reactor by conduit 7, which issues into the chamber of heat exchanger 5 situated under pipe plate 13/14. The vertical cylinder 30 mounted in this heat exchanger forces this primary medium initially to flow downwards, so that, after passing the edge 56, it flows upwards again into cylinder 30. As there is a ring of connecting channels 17 and 18 interposed between the centrally positioned inlet mouths 11 of the heat exchanger pipes and the surrounding ring outlets 12, which ring of connecting channels 17 and 18 fully traverses the pipe plate, it is possible for the primary cooling medium to reach chamber 20 by channels 17. This chamber 20 which is separated from chamber 15 by means of a removable cover 16, carries the primary medium via a nonreturn valve 21 to the inlet of a centrifugal pump. This pump consists of a centrifugal impeller 24 and of a surrounding ring of guide channels 26. The entrance aperture of the pump is bounded by an entrance member 23. Reference numeral 27 is an electric motor which can drive the pump. The whole assembly, comprising the pump impeller, pump motor and guide channels, is incorporated in one single part 25. After the primary cooling medium has traversed the circulation pump it is forced through a channel 19 situated between part 25 and the inlet member 23. From this channel 19 the primary medium can flow through the pipe plate for the second time, this time through a ring of apertures 18. Situated behind these channels 18 is a collecting box 29 which returns the cooling medium to the reactor by means of conduit 8.

Figure 2:
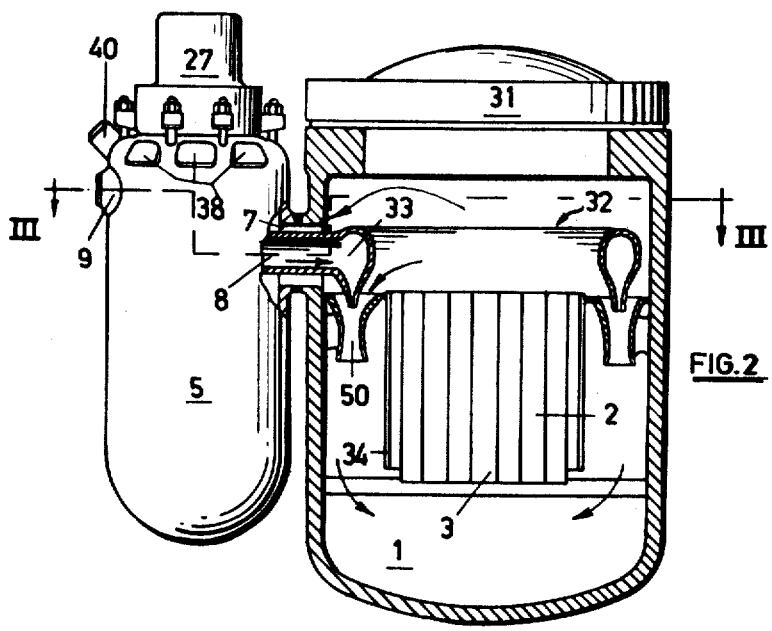
FIGURE 2 shows the same plant, in which, however, a vertical elevation of the heat exchanger is combined with a vertical section of the reactor vessel.

The steam accumulating chamber 39 is accessible at the top by means of a number of hand-hole covers which are not shown in FIGURE 1 but can be seen in FIGURE 2, where they are denoted by the numeral 38.

It will at once be clear that one of the advantages of the construction reproduced here consists in the great accessibility of the heat exchanger pipes used. It is merely necessary to uncouple the screw-bolt joints fitted at 28 to permit the removal of part 25 of the pump. After the inlet member 23 has likewise been taken apart, the central cover 16 can be opened. Should it be found in course of inspection that one of the heat exchanger pipes shows a leak, the inlet mouth of the pipe concerned in chamber 15 can be plugged up. After the hand-hole cover 38 under which the outlet mouth of the pipe in question is situated has been opened, this outlet mouth may also be plugged up. As the heat exchanger vessel 5 is rigidly connected with the reactor vessel only at the position of the coaxial pipe connection 7 and 8, the reactor vessel is perfectly free to expand in the remaining directions.

It can be seen in FIGURE 2, in which the reactor vessel is cut through vertically, that it is possible, for instance, to supply the primary cooling medium entering the reactor vessel to a ring-shaped accumulating box 32. From this accumulating box the medium can flow downwards through a number of outlets 33 of a ring of jet apparatuses 50. By means of these jet apparatuses the cooling medium flowing out of the reactor core is carried for the second time, under the action of the pressurized primary medium supplied by conduit 8, to inlet 3 of the reactor core 2 which is situated on its underside. The remaining portion of the primary cooling current can pass out of the reactor vessel by conduit 7. A heat-shield 34 is fitted beside the reactor core.

Figure 3:
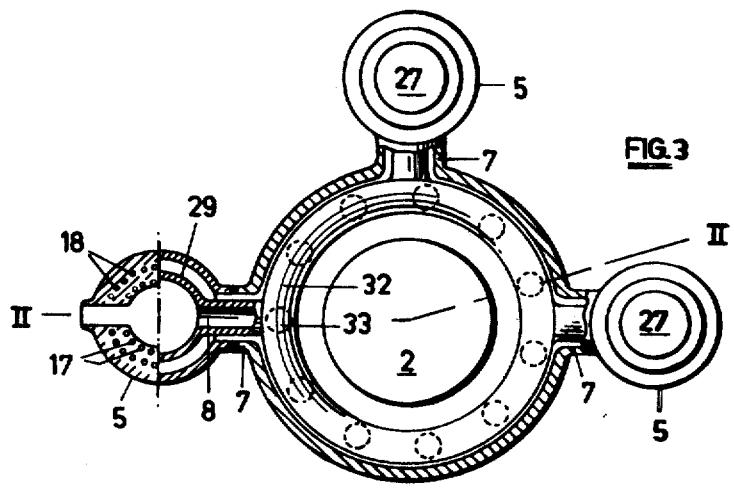
FIGURE 3 is a reproduction of the horizontal section III—III in FIGURE 2.

FIGURE 3 again shows, in a horizontal part cross-section, how the total set-up may be effected. The heat exchangers 5 may be positioned in a ring around the reactor.

Figure 4:
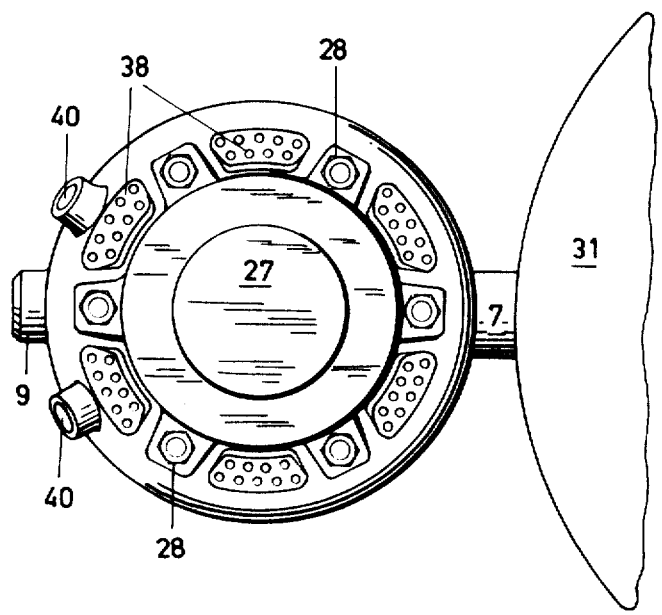
FIGURE 4 is a top view looking in the direction of the arrow I in FIGURE 1.

FIGURE 4 similarly needs little elucidation. This figure gives a top view of the plant outlined in FIGURE 1.

While preferred embodiments of the present invention have been described, further modifications may be made without departing from the scope of the invention. Therefore, it is to be understood that the details set forth or shown in the drawings are to be interpreted in an illustrative, and not in a limiting sense, except as they appear in the appended claims.

What is claimed is:

1. A nuclear energy reactor plant comprising:
   a nuclear reactor including a core containing fissile material, a reactor wall which envelops said core and which is resistant to internal pressure, said reactor wall defining a chamber which receives primary coolant from said core, said reactor further including a ring-shaped chamber within said first-mentioned chamber;
   at least one heat exchanger including means defining a primary coolant flow path and a separate, secondary coolant flow path arranged in heat transfer relationship with said primary flow path and further including a heat exchanger vessel which envelops said flow-path-defining means and which is resistant to internal pressure, said heat exchanger being mounted laterally of and at the height of said reactor core;
   connecting means extending laterally between said nuclear reactor and said heat exchanger, said connecting means including an outer conduit and an inner, coaxial conduit, said outer conduit connecting said heat exchanger wall with said reactor vessel at a location above said reactor core and communicating through one end with the interior of said reactor and through its other end with an end of said primary coolant flow path, said inner conduit connecting said ring-shaped chamber in said reactor with the other end of said primary coolant path; and
   fluid transfer means associated with said inner conduit for transmitting primary coolant through said inner conduit to said ring-shaped chamber; and at least one jet associated with said first-named chamber and with said ring-shaped chamber for passing primary coolant simultaneously from said first-mentioned chamber and from said ring-shaped chamber to said reactor core.

2. A nuclear energy reactor plant comprising:

a nuclear reactor including a reactor core and an enveloping reactor wall;

at least one heat exchanger positioned outside said reactor vessel, said heat exchanger including an enveloping heat exchanger vessel, an internal pipe plate which defines a plenum, a pipe bundle for transmitting secondary coolant, one end of the pipes of said bundle being assembled in said pipe plate and communicating with said plenum, said pipe plate having a removable wall part giving access to said plenum and to said one end of said pipes;

means for circulating primary coolant through said reactor and through said heat exchanger so as to flow over the outside of said pipes in said pipe bundle, said means including fluid transfer means close to said removable wall part and disposed on the opposite side of said removable wall part from said plenum, said pipe plate having channels therethrough which communicate with said fluid transfer means for supplying primary coolant to and receiving primary coolant from said fluid transfer means.

3. A nuclear reactor plant as in claim 2 wherein the other ends of the pipes in said pipe bundle are assembled in said pipe plate and are disposed in a ring pattern surrounding said one ends, said other ends communicating with a separate chamber defined between said pipe plate and said heat exchanger vessel.

4. A nuclear energy plant as in claim 3 wherein said heat exchanger vessel includes a plurality of apertures through which said other ends of said pipes are accessible in groups and removable cover plates closing said apertures.

5. A nuclear energy plant as in claim 3 wherein said plurality of channels extend through said pipe plate at a location between said one ends and said other ends of said pipes.

References Cited

UNITED STATES PATENTS

| 3,012,547 | 12/1961 | Ostergaard et al. | |
| 3,127,322 | 3/1964 | Dodd | 176—60 |
| 3,182,002 | 5/1965 | Laithwaite et al. | 176—65 |
| 3,185,631 | 5/1965 | Long et al. | 176—65 |
| 3,210,254 | 10/1965 | Fortescue | 176—60 |
| 3,242,981 | 3/1966 | Hutchinson et al. | 176—65 |
| 3,300,389 | 1/1967 | Packman et al. | 176—60 |

FOREIGN PATENTS 1,311,719   10/1963   France.

REUBEN EPSTEIN, *Primary Examiner.*

U.S. Cl. X.R.

165—107; 176—50, 60